(12) United States Patent
Sigler et al.

(10) Patent No.: US 9,440,305 B2
(45) Date of Patent: Sep. 13, 2016

(54) METHOD OF RESISTANCE SPOT WELDING ALUMINUM ALLOY WORKPIECES

(71) Applicant: GM Global Technology Operations LLC, Detroit, MI (US)

(72) Inventors: David R. Sigler, Shelby Township, MI (US); Michael J. Karagoulis, Okemos, MI (US)

(73) Assignee: GM Global Technology Operations LLC, Detroit (*) Notice: Subject to any disclaimer, the term of this patent is extended or adjusted under 35 U.S.C. 154(b) by 415 days.

(21) Appl. No.: 13/783,343

(22) Filed: Mar. 3, 2013

(65) Prior Publication Data

US 2014/0076859 A1    Mar. 20, 2014

Related U.S. Application Data

(63) Continuation-in-part of application No. 13/621,299, filed on Sep. 17, 2012, which is a continuation-in-part of application No. 12/768,928, filed on Apr. 28, 2010, now Pat. No. 8,274,010.

(51) Int. Cl.
| | |
|---|---|
| *B23K 11/11* | (2006.01) |
| *B23K 35/30* | (2006.01) |
| *B23K 11/30* | (2006.01) |
| *B23K 35/22* | (2006.01) |

(52) U.S. Cl.
CPC .............. *B23K 11/11* (2013.01); *B23K 11/115* (2013.01); *B23K 11/3063* (2013.01); *B23K 35/222* (2013.01); *B23K 35/302* (2013.01); *B23K 2203/10* (2013.01)

(58) Field of Classification Search
CPC ........ B23K 9/24; B23K 11/00; B23K 11/30; B23K 11/3063; B23K 35/00; B23K 35/02; B23K 35/0205; B23K 35/0255
See application file for complete search history.

(56) References Cited

U.S. PATENT DOCUMENTS

| | | |
|---|---|---|
| 1,303,919 A | 5/1919 | Lachman |
| 2,379,187 A | 6/1945 | Richards |
| 2,641,670 A | 6/1953 | Graves |
| 3,689,731 A | 9/1972 | Miller |
| 3,820,437 A | 6/1974 | Dyer et al. |
| 4,588,870 A | 5/1986 | Nadkarni et al. |
| 4,591,687 A | 5/1986 | Urech |
| 4,610,153 A | 9/1986 | Nedorezov |
| 5,015,816 A | 5/1991 | Bush et al. |

(Continued)

OTHER PUBLICATIONS

U.S. Appl. No. 13/777,345; Welding Electrode with Contoured Face; filed Feb. 26, 2013.

(Continued)

*Primary Examiner* — Brian Jennison
(74) *Attorney, Agent, or Firm* — Reising Ethington P.C.

(57) ABSTRACT

A method of resistance spot welding aluminum alloy workpieces together includes several steps. In one step a welding electrode is provided. The welding electrode has a weld face. In another step, the weld face of the welding electrode is shaped to have a desired radius of curvature. The shaped weld face is then textured to a desired surface roughness, and resistance spot welding using the welding electrode is performed to the aluminum alloy workpieces. In yet another step, the weld face is dressed to an extent sufficient to remove contamination build-up that may have accumulated on the weld face from the aluminum alloy workpieces.

14 Claims, 3 Drawing Sheets

(56) References Cited

U.S. PATENT DOCUMENTS

| | | |
|---|---|---|
| 5,155,320 A | 10/1992 | Simmons |
| 5,304,769 A | 4/1994 | Ikegami et al. |
| 5,844,194 A | 12/1998 | Kuwabara et al. |
| 5,951,888 A | 9/1999 | Oakley |
| 6,037,559 A | 3/2000 | Okabe et al. |
| 6,322,296 B1 | 11/2001 | Wetli et al. |
| 6,861,609 B2 | 3/2005 | Sigler |
| 7,249,482 B2 | 7/2007 | Chen |
| 8,222,560 B2 | 7/2012 | Sigler et al. |
| 8,274,010 B2 | 9/2012 | Sigler et al. |
| 8,350,179 B2 | 1/2013 | Schroth et al. |
| 8,436,269 B2 | 5/2013 | Sigler et al. |
| 2003/0116539 A1 | 6/2003 | Wile et al. |
| 2005/0211677 A1* | 9/2005 | Chen .................. B23K 11/115 219/117.1 |
| 2006/0081563 A1 | 4/2006 | Ueda et al. |
| 2008/0078749 A1* | 4/2008 | Sigler et al. .................. 219/119 |
| 2009/0255908 A1 | 10/2009 | Sigler et al. |
| 2009/0302009 A1 | 12/2009 | Sigler et al. |
| 2010/0258536 A1 | 10/2010 | Sigler et al. |
| 2013/0008295 A1 | 1/2013 | Sigler et al. |
| 2013/0015164 A1 | 1/2013 | Sigler et al. |
| 2013/0048613 A1 | 2/2013 | Sigler et al. |

OTHER PUBLICATIONS

U.S. Appl. No. 13/841,397; Weld Face Design for Spot Welding; filed Mar. 15, 2013.

* cited by examiner

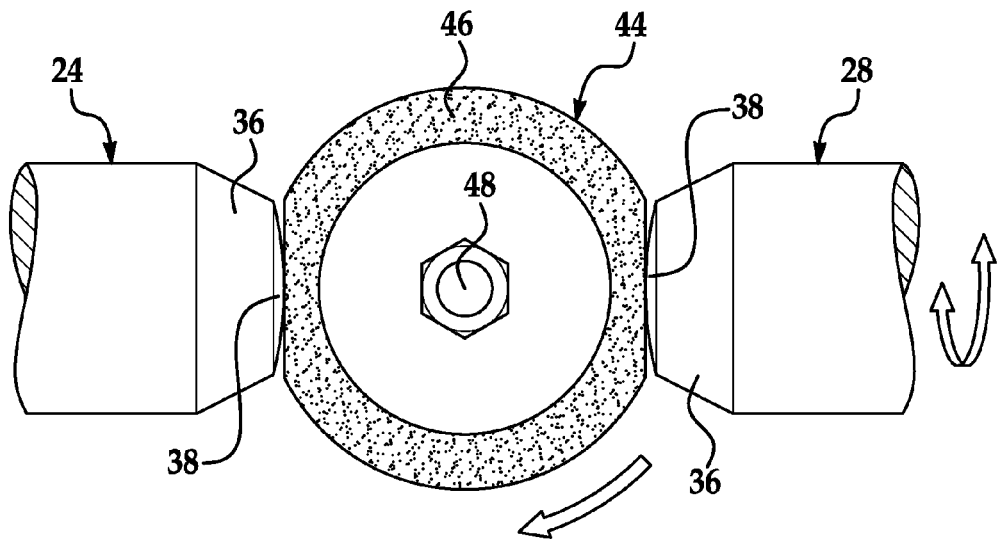
FIG. 5
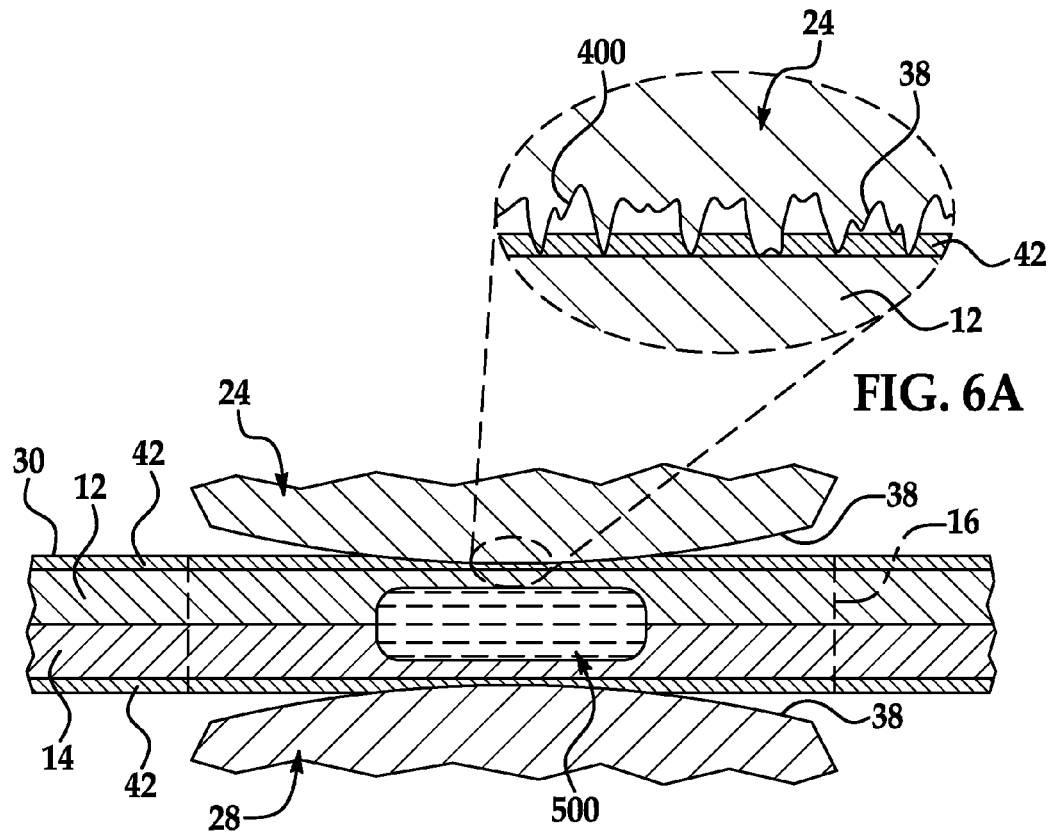
FIG. 6A
FIG. 6

METHOD OF RESISTANCE SPOT WELDING ALUMINUM ALLOY WORKPIECES

CROSS-REFERENCE TO RELATED APPLICATIONS

This application is a continuation-in-part of U.S. application Ser. No. 13/621,299, filed on Sep. 17, 2012, now U.S. Patent Application Publication No. 2013/0015164, which is a continuation-in-part of U.S. application Ser. No. 12/768,928, filed on Apr. 28, 2010, now U.S. Pat. No. 8,274,010. The complete disclosures of these applications are incorporated herein by reference.

TECHNICAL FIELD

The technical field of this disclosure relates generally to processes for resistance spot welding aluminum alloy workpieces, and to welding electrodes used with these processes.

BACKGROUND

Amid customary automotive manufacture, sheet metal workpiece layers are joined together to produce body panels such as those used in doors, hoods, trunk lids, and lift gates. Increasingly, in an effort to reduce vehicle body weight, these body panels are designed to include at least a pair of aluminum alloy sheet metal layers, rather than steel sheet. A series of individual resistance spot welds are usually made along an overlapping or other type of contacting interface to join the aluminum alloy sheet metal layers together, as one step in the larger overall manufacturing operation. Automated welding guns ordinarily perform this task.

Resistance spot welding is a joining process in which heat is generated by the resistance to the flow of electrical current through the sheet metal layers being joined. Typically, a pair of opposing welding electrodes is brought into contact with opposite sides of sheet metal layers at diametrically common spots (each spot sometimes being called the contact patch). A momentary electrical current is then sent through the sheet metal layers. Resistance to the flow of electrical current through the bulk sheet metal layers and their faying interface generates heat at the faying interface (i.e., the contacting interface), forming a molten weld pool which, upon stopping the current flow, solidifies into a weld nugget. The opposing welding electrodes also clamp the sheet metal layers under pressure to provide good electrical contact and to contain the molten weld pool at the intended weld site.

Automotive body panels made up of aluminum alloy sheet metal layers can present peculiar challenges for the spot welding step. For one, aluminum alloys are covered by oxide layers on their outer surfaces created both by processes experienced in mill operations (e.g., annealing, solution treatment, casting, etc.) as well as environmental exposure, which increases electrical resistance at the contact patch. Because of the high electrical resistance of the oxide layers and the relatively low thermal and electrical resistance of the underlying aluminum alloy, a high current level is typically required to form a weld pool at the aluminum alloy sheet metal layers' faying interface.

While helpful in forming a weld pool at the desired location, a high current level can create excessive heat at the contact patch which, in turn, may accelerate a metallurgical reaction between the aluminum alloy material and copper alloy material of the associated welding electrode. This reaction causes a contamination layer of copper-aluminum alloy to build-up or accumulate on the welding electrode. If left undisturbed, the contamination build-up can spall and form pits in the welding electrode, which ultimately will harm welding performance and complicate electrode dressing. These challenges, as well as others, oftentimes call for different considerations than spot welding workpieces made of steel.

SUMMARY OF THE DISCLOSURE

A method of resistance spot welding aluminum alloy workpieces may include several steps. In one step, a welding electrode is provided that includes a weld face. In another step, the weld face of the welding electrode is shaped to have a radius of curvature ranging between approximately 20 millimeters (mm) and 40 mm, including the end values twenty and forty of the range. In yet another step, the previously-shaped weld face is textured to have a peak-to-valley surface roughness ($R_p$) ranging between approximately 2 micrometers (μm) and 50 μm, including the end values two and fifty of the range. Resistance spot welding is performed with the welding electrode to join the aluminum alloy workpieces together in a further step. This step is typically repeated several times to join multiple successive sets of aluminum alloy workpieces into automobile body panels. In another step, the weld face is re-textured, if needed and if desired, to re-establish the surface roughness prior to additional welding. And in another step, the weld face is dressed, when needed, to an extent that is sufficient to remove contamination build-up on the weld face from the aluminum alloy workpieces. Both of the welding electrodes used in the resistance spot welding step may be shaped and dressed in the same way, or they may not.

A method of maintaining a welding electrode during its use in resistance spot welding aluminum alloy workpieces may include several steps. In one step, a weld face of the welding electrode is textured to have a desired surface roughness. In another step, the weld face is textured again to have a desired surface roughness after a first number of individual resistance spot welds are performed. And in yet another step, the weld face is dressed to remove a desired depth of material of the welding electrode after a second number of individual resistance spot welds are performed. The second number of individual resistance spot welds is greater than the first number of individual resistance spot welds. In another step, the dressed weld face is textured to a desired surface roughness.

A method of resistance spot welding aluminum alloy workpieces may include several steps. In one step, a welding electrode is provided that includes a weld face. The weld face of the welding electrode has a radius of curvature ranging between approximately 20 millimeters (mm) and 40 mm, including the end values twenty and forty of the range, and is textured to a desired surface roughness. Multiple individual resistance spot welds are then formed in aluminum alloy workpieces using the welding electrode in another step. In each individual resistance spot weld, the previously-textured weld face makes surface-to-surface abutment with a weld site surface of the corresponding aluminum alloy workpiece. The roughness of the weld face and its abutment with the weld site surface under clamping pressure penetrates oxide layers at the weld site surface and facilitates the flow of electrical current through the corresponding aluminum alloy workpiece during a resistance spot welding event. The penetration of the oxide layers helps limit excessive heat generation that may otherwise occur. In another step, when it is determined that the weld face has substantially lost its roughness either by weld count, surface roughness measurement, visual inspection, or other means, the weld face is textured again. In yet another step, the weld face is dressed to an extent sufficient to remove contamination build-up on the weld face from the aluminum alloy workpiece. And in another step, the previously-dressed weld face is textured to a desired surface roughness.

BRIEF DESCRIPTION OF THE DRAWINGS

FIG. 5 is a side view of a texturing tool and welding electrodes;

FIG. 6 is an enlarged sectional view of a pair of welding electrodes performing a resistance spot weld on a pair of overlapping aluminum sheet metal layers;

FIG. 6A is an enlarged view taken at the circle in FIG. 6;

DETAILED DESCRIPTION

The methods detailed in this description resolve several challenges encountered when resistance spot welding is performed on workpieces made of an aluminum alloy to produce automotive body panels and other components. The methods also provide several improvements in the accompanying welding process. The term workpieces, as used herein, refers to metal layers that include sheets, extrusions, castings, and other pieces that are resistance spot welded together. In the described welding methods, a welding electrode is designed to have a textured weld face that exhibits a domed radiused profile with a sharp radius of curvature fairly atypical of traditional welding electrodes used in aluminum alloy applications. The textured weld face can penetrate oxide layers present on the surface of aluminum alloy workpieces, which allows for more efficient and concentrated delivery of an electric current from the weld face to the workpieces. The welding electrode can be re-dressed to preserve the desired radiused profile of the weld face and to remove contamination build-up, and can be re-textured to produce a surface roughness that might have been impaired. The re-dressing and re-texturing can be performed multiple times, as needed, to prolong the welding electrode's useful life. All of this is described in greater detail below, and though described in the context of automotive body panels, the methods detailed may be suitable in other contexts such as industrial equipment applications.

Figure 1:
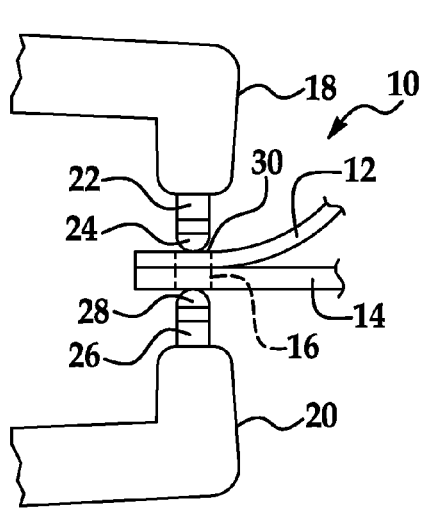
FIG. 1 is a side view of a resistance spot welding assembly.

FIG. 1 shows one example of a welding electrode assembly 10 that can be used to resistance spot weld a first aluminum alloy workpiece or sheet metal layer 12 and a second aluminum alloy workpiece or sheet metal layer 14 at a welding site 16. The first and second aluminum alloy sheet metal layers 12, 14 are composed of an aluminum alloy such as an aluminum-magnesium alloy, an aluminum-silicon alloy, or an aluminum-magnesium-silicon alloy. A specific example includes a 1.0 millimeter (mm) thick 5754-O aluminum alloy. Other aluminum alloys and thicknesses are possible. In another specific example, the aluminum alloy workpiece can have a thickness of up to approximately 6.0 mm.

The welding electrode assembly 10 is usually one part of a larger automated welding operation, and includes a first welding gun arm 18 and a second welding gun arm 20 that are mechanically and electrically configured to repeatedly form spot welds, as is well understood in the art. The first welding gun arm 18 has a first electrode holder 22 that retains a first welding electrode 24, and likewise the second welding gun arm 20 has a second electrode holder 26 that retains a second welding electrode 28. The welding electrodes 24, 28 can be composed of a suitable copper alloy. When performing resistance spot welding, the welding gun arms 18, 20 clamp their respective welding electrodes 24, 28 against opposite sides of the overlapping sheet metal layers 12, 14 at the weld site 16 with accompanying weld faces oriented in diametric alignment with each other. The first welding electrode 24 is depicted in the remaining Figures and is subsequently referred to in this description for illustrative purposes, though the Figures and description can also apply equally to the second welding electrode 28, if desired.

Figure 2:
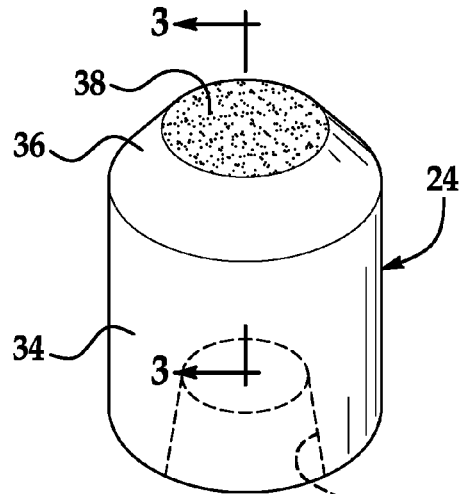
FIG. 2 is a perspective view of a welding electrode.
Figure 3:
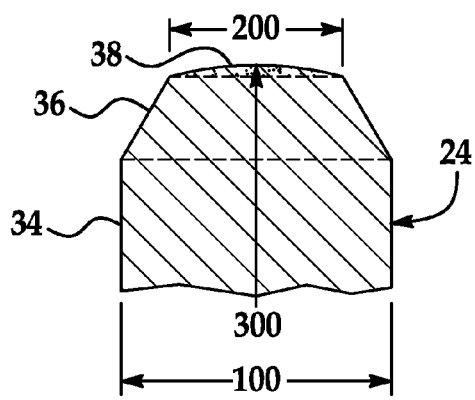
FIG. 3 is a sectional view of the welding electrode taken at arrows 3-3 in FIG. 2.
Figure 7:
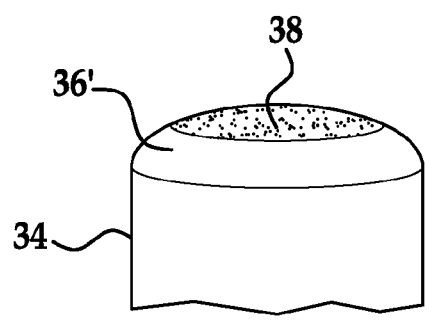
FIG. 7 is a side view of a welding electrode.

FIGS. 2 and 3 show one example of the first welding electrode 24. The first welding electrode 24 physically contacts an outer surface 30 of the first aluminum alloy sheet metal layer 12 and exchanges electrical current with the second welding electrode 28 through both sheet metal layers 12, 14. The first welding electrode 24 has a generally cylindrical body 34 that is hollowed with a recess 32 at one end for insertion of, and attachment with, the first electrode holder 22. The first welding electrode 24 also has a frusto-conical section 36 continuing from the circumference of the cylinder body 34, and a weld face 38 continuing from the circumference of the frusto-conical section 36. The weld face 38 is domed, preferably spherically in shape, and is the section of the first welding electrode 24 that abuts and impresses into the outer surface 30 of the first aluminum alloy sheet metal layer 12 during use. It should be noted that the welding electrode shown in FIGS. 2 and 3 and described here is only a preferred embodiment. Other constructions of the first welding electrode 24 are possible including, for example, one that does not include the frusto-conical section 36, but instead includes a curved section 36' that transitions from the body 34 to the weld face 38, as shown in FIG. 7.

Referring now particularly to FIG. 3, the cylinder body 34 has a diameter dimension 100, the weld face 38 has a diameter dimension 200, and the weld face 38 has a convex radius of curvature dimension 300. The dimensions 100, 200, and 300 may vary in value depending upon, among other factors, manufacturing tolerances, a thickness dimension of the sheet metal layers 12, 14, the exact material composition of the sheet metal layers 12, 14, and the current density exchanged between the electrodes 24, 28. In different examples, the diameter dimension 100 can range between approximately 10 mm and 20 mm; the diameter dimension 200 can range between approximately 5.5 mm and 20 mm; and the radius of curvature dimension 300 can range between approximately 20 mm and 40 mm, or can be approximately 25 mm. The ranges in this description are meant to include their outer and end limits such that the range 20 mm to 40 mm includes the values twenty and forty. Furthermore, in other examples, other ranges and values are possible for the dimensions 100, 200, and 300.

The first welding electrode 24 is subject to several steps to help ensure welds of high quality. In one embodiment, before being used in a resistance spot welding method, the first welding electrode 24 is initially shaped, to provide it with a domed weld face 38, and then the weld face 38 is textured to provide it with a desired surface roughness. After being used to execute multiple resistance spot welds, the first welding electrode 24 may be re-textured, or may be dressed or re-dressed and then re-textured. The dressing is performed to remove a desired depth of material from the electrode 24 sufficient to strip away contamination that has built-up on the weld face 38 and re-establish the rounded profile of the weld face 38. The re-texturing is performed to texture the weld face 38, which may have been dulled, flattened, filled-in by contamination, or damaged by pitting over the course of repeated resistance spot welding uses, back to the desired surface roughness. More, less, or different steps can be performed in the method in other embodiments; for example, the first welding electrode 24 need not be initially shaped if it is originally supplied in a shape and size suitable for use.

The first welding electrode 24 is shaped to bring the electrode to a desired form and structure. In the example of FIG. 2, the desired form and structure includes at least the diameter (dimension 200) and the radius of curvature (dimension 300) of the weld face 38; in other examples, the desired form and structure can take on different shapes. Initial shaping is usually performed when an electrode is originally supplied in a stock or standard shape and size that is unsuitable for use with the particular application. In automotive applications, electrodes are sometimes originally supplied as ball-nose shaped electrodes with diameters of, for instance, a half inch, five-eighths inch, or three-quarters inch. These electrodes need to be shaped to form the frusto-conical section 36 and the weld face 38 of the first welding electrode 24. The dimensions 200 and 300 can be fashioned to a specified value in the shaping step such that, for example, the radius of curvature dimension 300 is approximately 25 mm and the dimension 200 is set as desired. Different metalworking tools and techniques can be used during the shaping step. In one example, a cutting tool can be used to fashion the frusto-conical section 36, the weld face 38 diameter 200 to a specified value, and the radius of curvature dimension 300 of the weld face 38 to a specified value. Other metalworking tools and techniques may include grinding or forging of the weld face.

Figure 4:
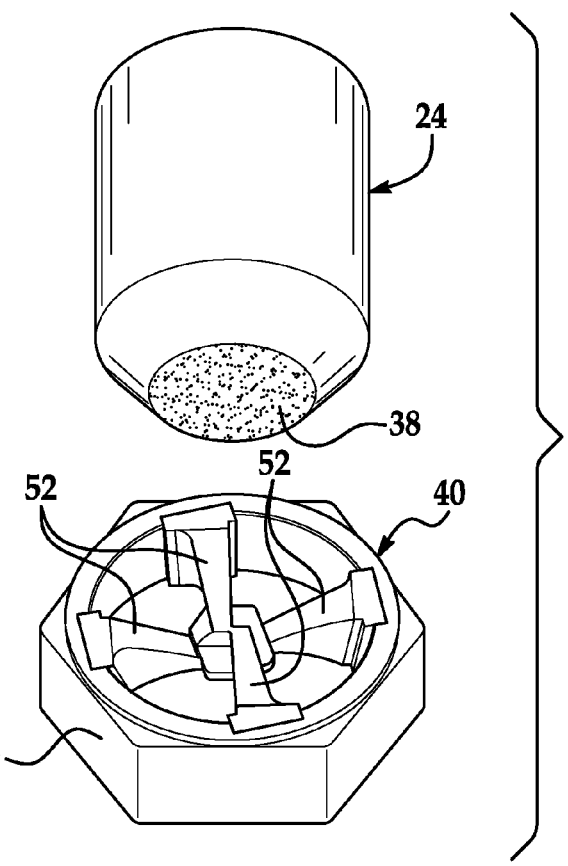
FIG. 4 is a perspective view of a cutting tool and welding electrode.

FIG. 4 shows one example of a cutting tool 40 that can be used during the shaping step (and the later dressing step, as subsequently described). The cutting tool 40 has a hexagonally-shaped body 50 with four cutting blades 52 located at its interior. The cutting tool 40 is equipped in a larger cutting assembly and, in use, is advanced toward the first welding electrode 24 and is rotated about its center axis. This can be a part of an automated operation. The rotating cutting blades 52 receive an end of the first welding electrode 24 and cut or shear off a depth of material from the first welding electrode until the weld face 38 is formed with its desired diameter and radius of curvature. The frusto-conical section 36 (or other section surrounding the weld face 38 such as a curved section) is also formed by the rotating cutting blades 52. The exact depth of material removed from the first welding electrode 24 during initial shaping depends upon the depth of cut necessary to reshape the electrode to attain the desired shape for spot welding aluminum alloy workpieces. In some examples, the depth of material removed can range from approximately 25 micrometers (μm) to 2500 μm, though this can depend on the originally supplied electrode.

The freshly dressed weld face 38 of the first welding electrode 24 is then textured to produce a desired surface roughness that serves, during spot welding, to penetrate and fracture through oxide layers 42 (for illustrative and simplicity purposes, a single and enlarged oxide layer is shown in FIGS. 6 and 6A) formed on the outer surface 30 of the first aluminum alloy sheet metal layer 12. This capability of the weld face 38 improves electrical current flow between the weld face and the first aluminum alloy sheet metal layer 12 by forming numerous metal-to-metal contacts that allow current to bypass the oxide layers 42 and, in turn, reduces the overall electrical resistance of the sheet metal layer such that less heating and damage occurs at the weld face as well as at the outer surface 30. The texturing may be applied only on the section of the first welding electrode 24 that comes into direct contact with the first aluminum alloy sheet metal layer 12—in this case the weld face 38 or the portion of the weld face that contacts the workpiece surface—or it may be applied to a broader area that surrounds and includes the weld face 38. Different equipment and techniques can be used in the texturing step, and may involve detachment and removal of the first welding electrode 24 from the first electrode holder 22, or may involve moving the first welding gun arm 18 to the equipment, or may involve moving the equipment to the first welding gun arm 18.

FIG. 5 shows one example of a piece of equipment that can be used during the texturing and re-texturing steps. Here, as shown, the weld faces 38 of both the first and second welding electrodes 24, 28 can be textured together, even though this does not necessarily have to be the case. The piece of equipment may include a texturing wheel 44 that carries an abrasive media 46 at its periphery and that rotates about a shaft 48. Its periphery is elastically deformable and yields inwardly as it is engaged by the first and second welding electrodes 24, 28 in order to more readily texture the domed weld faces 38. The first and second welding electrodes 24, 28 can themselves be turned and manipulated to be sure the weld faces 38 are fully textured. The abrasive media 46 can be a Scotch-Brite™ media supplied by the 3M company of St. Paul, Minn., U.S.A., a stainless steel wire media, or another media.

Figure 8:
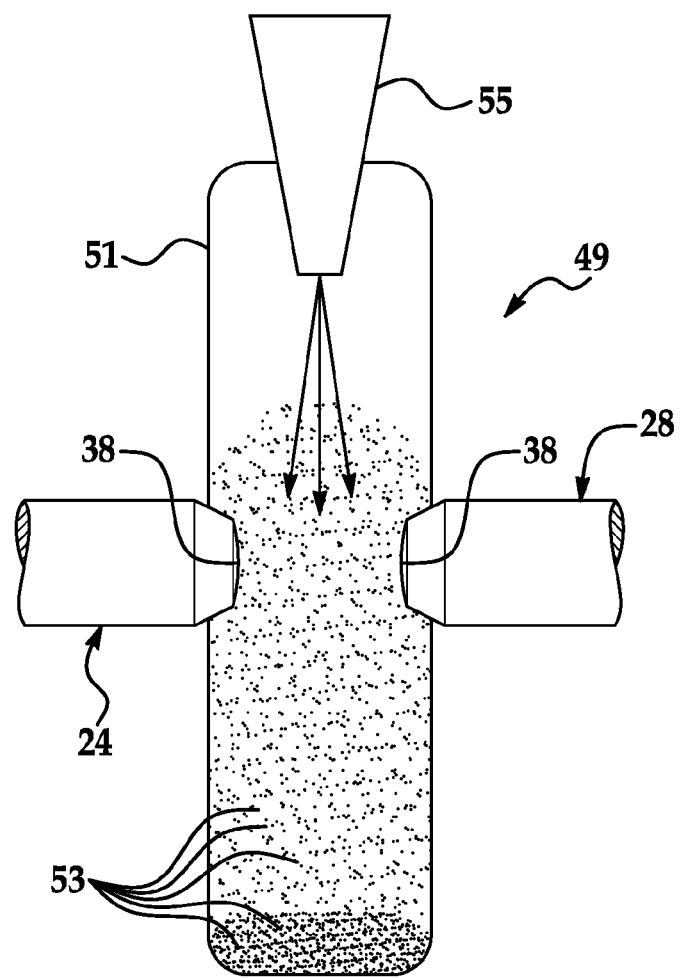
FIG. 8 is a side view of a grit blasting apparatus.

In another example shown in FIG. 8, the weld faces 38 of the first and second welding electrodes 24, 28 can be textured by an abrasive or grit blasting process and apparatus 49. Here, as shown, the weld faces 38 of the first and second welding electrodes 24, 28 can be textured together, though not required. The grit blasting apparatus 49 may include a containment 51 with abrasive media such as small grit particles 53 like glass beads, sand, or steel held in the containment 51, and may further include a high pressure air nozzle 55 equipped to the containment 51. The weld faces 38 are exposed to the small grit particles 53 as the particles are forcibly swirled around inside of the containment 51 via the high pressure air nozzle 55. Still, other grit blasting processes and apparatuses are possible, including one in which small grit particles are discharged directly at the weld faces 38.

Whatever the equipment and technique, the resulting surface roughness measured from peak-to-valley can range between approximately 2 μm and 50 μm, or in some cases between approximately 5 μm and 10 μm. It has been found that surface roughness values within these ranges can effectively penetrate and fracture the oxide layers 42, and can ease electrical current flow therethrough. Without wishing to be confined to a particular theory of causation, it is currently believed that upon surface-to-surface abutment of the weld face 38 and the first aluminum alloy sheet metal layer 12, the surface roughness of the weld face 38 causes protrusion deformation and fracturing of the oxide layers 42 as contact is made to mitigate and, in some instances, altogether eliminate the increased electrical resistance otherwise caused by the oxide layers. The aggregate effect of the microscopic peak-to-valley surface roughness is also thought to deform the aluminum alloy surface which causes the oxide layers 42 to laterally stretch and break-up and makes it easier to pass an electrical current through the oxide layers with minimized electrical resistance. This is shown schematically in the enlargement of FIG. 6A.

A surface texture 400 of the weld face 38 allows its protruding peaks to penetrate through the oxide layers 42 and make direct contact with the first aluminum alloy sheet metal layer 12 underneath the oxide layers. While shown schematically, the surface roughness and texture 400 has a peak-to-valley measurement that is typically much greater than a thickness of the oxide layers 42; as recounted immediately above, the peak-to-valley measurement of the surface texture 400 can range between approximately 2 μm and 50 μm, while the oxide layers can have a thickness of approximately 0.05 μm. The electrical resistance caused by the oxide layers 42 is essentially and substantially eliminated at the welding site 16 compared to the electrical resistance at other sections of the oxide layers 42 outside of the welding site that are not penetrated and fractured by the surface texture 400.

The relatively high thermal and electrical conductivity of aluminum alloy, and the electrical resistance resulting from the oxide layers 42 if not penetrated—however small—may cause heat to be generated at the surface-to-surface interface between the weld face 38 and the first aluminum alloy sheet metal layer 12 during the resistance spot welding event. The heat is often sufficient to accelerate a metallurgical reaction between the aluminum alloy material of the workpieces and the copper alloy material of the weld face 38. Over time, contamination derived from the reaction may accumulate and build-up and eventually spall and pit on the weld face 38. The resulting contamination build-up is oftentimes harder than the underlying welding electrode. To counteract these drawbacks, a flatter weld face having a relatively large radius of curvature ranging between about 50 mm and 200 mm has previously and conventionally been used to resistance spot weld aluminum alloy workpieces.

While the larger radii of curvature retards the metallurgical reaction between the aluminum and copper alloy materials by spreading the current flow over a larger contact area to reduce current density, a sharper radius of curvature like the 20 mm to 40 mm dimension 300 disclosed in this description is still frequently sought and desired. First, the sharper radius of curvature can more readily access harder-to-reach and uneven and nonplanar weld sites that may not be physically accessible by a larger radius of curvature. The sharper radius of curvature of the weld face 38 can also execute effective welds at uneven and nonplanar welding sites, whereas one with a larger radius of curvature can be too unwieldy to do so. Second, the sharper radii of curvature permits execution of spot welds under less-than-desired conditions, such as when the weld site 16 has a slight gap between the aluminum alloy sheet metal layers 12, 14 or where the sheet metal layers do not necessarily make perfectly flush face-to-face contact at their interface. And third, a weld face with a sharper radius of curvature can pass electrical current at a higher current density so as to produce welds of higher quality and improve initiation of a weld pool 500 (FIG. 6) at the faying interface of the aluminum alloy sheet metal layers 12, 14. Other refinements attributable to a sharper radius of curvature of the weld face 38 may exist.

The weld face 38 shown and described here can have a radius of curvature dimension 300 between 20 mm and 40 mm because of its ability to minimize the electrically resistive effect of the oxide layers 42. Specifically, the textured weld face 38 with numerous protrusions can penetrate and fracture the oxide layers 42, as described earlier, thus permitting the weld face to have a sharper radius of curvature since current can be delivered to the aluminum alloy sheet metal layers 12, 14 more efficiently without the need for the relatively larger radius of curvature (i.e., 50-200 mm) and its attendant large contact area and lower current density. In a sense, the surface texture 400 imparted to the weld face 38 allows for the weld face to be sharply radiused, which helps promote the formation of efficient and quality resistance spot welds between the aluminum alloy sheet metal layers 12, 14, while experiencing a rate of contamination build-up and spalling and pitting that is generally associated with a flatter weld face.

Once textured, the first welding electrode 24 can be used to form numerous individual resistance spot welds between the same or different aluminum alloy sheet metal layers 12, 14. But over time, contamination builds up on the welding electrode 24 at the weld face 38. The contamination build-up can hamper welding performance and, when sufficiently thick, and as recounted above, can spall and leave pits on the weld face 38. Dressing, or re-dressing, may therefore be performed intermittently to shave and remove the contamination build-up before spalling and pitting begins to occur. In some instances, built-up contamination can accumulate after less than one-hundred individual resistance spot welds are executed, somewhere between ten and one-hundred spot welds, or somewhere between forty and one-hundred spot welds, and so the weld face 38 is dressed within these weld numbers; for example, dressing may be performed before one-hundred individual spot welds are executed. Though because contamination build-up may depend on, among other factors, the material compositions of the welding electrode 24 and sheet metal layer 12, more than one-hundred spot welds can be executed without dressing in other examples.

The cutting tool of FIG. 4 can be used during the dressing step as well. During dressing, as before, the cutting tool 40 is advanced toward the first welding electrode 24 and rotated about its center axis. The rotating cutting blades 52 meet the weld face 38 and shear a depth of material from the first welding electrode 24 that is sufficient to take off any built-up contamination. The exact depth of material removed may depend on the expected contamination build-up amount. In some examples, the depth of material removed from the weld face 38 can range between approximately 10 μm and 100 μm, or between approximately 10 μm and 40 μm. Since the dressing step may be set up to be sufficiently robust to insure that the blades 52 break through the contamination build-up and hence begin cutting, larger cut depths of approximately 25 μm to 250 μm allow a more robust process, with a preferred cut depth of approximately 50 μm to 150 μm. Dressing parameters that remove less material than those above may not be robust enough to ensure consistently breaking through the built-up contamination and initiate cutting; that is, the cutting blades 52 may merely ride on top of the build-up. Furthermore, cut depths greater than 250 μm may shorten electrode life unnecessarily.

At these relatively minimal cut depths and removal rates, the welding electrode 24 can endure a greater number of dressings, and thus execute a greater number of spot welds in its lifetime, if used only to weld aluminum-alloy-to-aluminum-alloy workpieces. Using the welding electrode 24 to weld steel-to-steel workpieces may necessitate more frequent dressing. For instance, when resistance spot welding steel-to-steel sheet metal layers, particularly Zn-coated steel-to-steel, the welding electrode 24 can experience peening in which the weld face 38 is locally flattened at the initial contact point between the electrode and steel or can experience mushrooming in which portions of the electrode deform and are displaced around the sides of the weld face 38. This occurs in part due to the hardness of steel and the relatively high temperature at the weld face 38 (i.e., steel melts above 1,500° C., while aluminum alloys melt at only approximately 600° C.). The high temperature can bring the copper alloy of the welding electrode 24 to a state of malleability, and the hardness of steel can deform it.

The hardness of steel may also dull and flatten the surface roughness of the weld face 38 more quickly than a softer aluminum alloy. Dulling or flattening the surface roughness has little consequence in steel-to-steel spot welding since steel, and especially galvanized steel, does not experience the effects from surface oxides that routinely occur for aluminum alloys, i.e., the texture is not needed to break through the surface oxides to improve spot welding. In addition, the high temperatures accelerate a metallurgical reaction between the copper alloy material of the electrode and a zinc coating on the steel surface. This forms a soft copper-zinc alloy layer on the electrode surface, which should be removed before welding. Among other things, this means that, when resistance spot welding steel-to-steel workpieces, dressing is typically required to re-establish the weld face profile and remove the alloy layer in order to prepare the weld face for additional welds; thus, texturing alone without dressing would simply not suffice to restore the weld face.

Peening can typically be avoided if the welding electrode 24 is used only to resistance spot weld the aluminum-alloy-to-aluminum-alloy workpieces together. This is because aluminum alloys are generally softer than steel and have a lower melting point. As such, the welding electrode 24 would not cycle to as high a temperature when resistance spot welding aluminum alloy workpieces as it would during spot welding steel-to-steel workpieces, and the welding electrode would typically not be rendered malleable in the process. The avoidance of electrode peening reduces the depth of material that needs to be removed from the welding electrode 24 during dressing. For example, the combination of surface peening and formation of a copper-zinc alloy layer caused by welding steel-to-steel workpieces usually requires the removal of a greater depth of material during dressing in order to take off the deformed and displaced material around the weld face and the copper-zinc alloy layer. With peening and copper-zinc alloy formation, the depth of material removed from the weld face 38 could be greater than approximately 100 μm, and in one example could range between approximately 100 μm to 200 μm. In one example, a welding electrode with a weld face diameter of 12 mm, a 25 mm radius of curvature, and a dressable length of 6.5 mm, and which is used only to spot weld aluminum-alloy-to-aluminum-alloy workpieces, can endure a total of seventy two dressings before it needs to be replaced; while the same electrode, if used only to spot weld steel-to-steel workpieces, can only endure a total of forty-three dressings before it needs to be replaced. Hence, the welding electrode can endure approximately sixty-seven percent more dressings before replacement when it is only used in aluminum alloy applications and not steel-to-steel applications.

Lastly, because the dressing step will likely take away the previously-applied surface roughness, the texturing step may again be performed to at least the weld face 38 of the first welding electrode 24. The texturing step may also be performed in absence of the dressing step after a number of individual resistance spot welds have been executed to aluminum-alloy-to-aluminum-alloy workpieces. That is to say, the weld face 38 of the first welding electrode 24 may be re-textured a number of times before dressing is performed at all. The re-texturing is suitable in instances where contamination build-up is not great enough to call for a re-dressing, and the surface texture has been mechanically deformed and has some contamination build-up. The re-texturing in these instances would remove some or even all of the contamination build-up without the need of dressing, and would restore the weld face 38 so that it will again suitably penetrate through the oxide layers 42. In one example, the weld face 38 is re-textured after approximately ten to twenty individual resistance spot welds are executed. Dressing, on the other hand, is ideally performed just before spalling and pitting build-up layer occurs. Re-texturing without dressing prolongs the useful life of the welding electrode.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding aluminum alloy workpieces together, the method comprising;
   providing a welding electrode having a weld face;
   shaping the weld face of the welding electrode to have a radius of curvature ranging between approximately 20 millimeters (mm) and 40 mm, inclusive;
   texturing the weld face after shaping to provide the weld face with a peak-to-valley surface roughness ranging between approximately 2 micrometers (μm) and 50 μm, inclusive;
   performing resistance spot welding with the welding electrode to form a plurality of resistance spot welds between overlapping aluminum alloy workpieces; and
   dressing the weld face to re-establish a radius of curvature of the weld face that ranges between approximately 20 mm and 40 mm, inclusive, and to remove a depth of material from the weld face sufficient to remove contamination build-up on the weld face from performing resistance spot welding.

2. The method as set forth in claim 1, further comprising texturing the weld face to provide the weld face with a peak-to-valley surface roughness ranging between approximately 2 μm and 50 μm, inclusive, after dressing of the weld face.

3. The method as set forth in claim 1, further comprising texturing the weld face again to provide the weld face with a peak-to-valley surface roughness ranging between approximately 2 μm and 50 μm, inclusive, after resistance spot welding is performed with the welding electrode but before dressing of the weld face.

4. The method as set forth in claim 3, wherein texturing the weld face again is performed after 10 to 20 individual resistance spot welds are performed.

5. The method as set forth in claim 1, wherein the weld face of welding electrode is shaped to have a radius of curvature of approximately 25 mm.

6. The method as set forth in claim 1, wherein the weld face is textured after shaping to provide the weld face with a peak-to-valley surface roughness ranging between approximately 5 μm and 10 μm, inclusive.

7. The method as set forth in claim 1, wherein less than 100 individual resistance spot welds are formed with the welding electrode between overlapping aluminum alloy workpieces before the weld face is dressed to re-establish a radius of curvature of the weld face that ranges between 20 mm and 40 mm, inclusive, and to remove a depth of material from the weld face sufficient to remove contamination build-up on the weld face from the aluminum alloy workpieces.

8. The method as set forth in claim 1, wherein between 10 and 100 individual resistance spot welds are formed between overlapping aluminum alloy workpieces before the weld face is dressed to re-establish a radius of curvature of the weld face that ranges between 20 and 40 mm, inclusive, and to remove a depth of material from the weld face sufficient to remove contamination build-up on the weld face from the aluminum alloy workpieces.

9. The method as set forth in claim 1, wherein dressing the weld face removes a depth of material of the welding electrode ranging between approximately 25 μm and 250 μm, inclusive.

10. The method as set forth in claim 1, wherein the dressing the weld face removes a depth of material of the welding electrode ranging between approximately 50 μm and 150 μm, inclusive.

11. The method as set forth in claim 1, wherein performing resistance spot welding comprises bringing the welding electrode to a weld site surface of an aluminum alloy workpiece, wherein the weld face makes surface-to-surface abutment with the weld site surface and the roughness of the weld face and its abutment with the weld site surface under clamping pressure facilitates the flow of electrical current through oxide layers at the weld site surface and at least limits excessive heat generation thereat during electrical current flow.

12. A method of resistance spot welding aluminum alloy workpieces together, the method comprising:

providing a welding electrode having a weld face, wherein the weld face has a radius of curvature ranging between approximately 20 mm and 40 mm, inclusive;

texturing the weld face to provide the weld face with a surface roughness;

performing resistance spot welding with the welding electrode to form a plurality of individual resistance spot welds between overlapping aluminum alloy workpieces, wherein, during formation of each individual resistance spot weld, the textured weld face makes surface-to-surface abutment with a weld site surface of an aluminum alloy workpiece, and the surface roughness of the weld face and its abutment with the weld site surface under clamping pressure facilitates the flow of electrical current through oxide layers at the weld site surface and at least limits excessive heat generation thereat during electrical current flow;

dressing the weld face to re-establish a radius of curvature of the weld face that ranges between approximately 20 mm and 40 mm, inclusive, and to remove a depth of material from the weld face sufficient to remove contamination build-up on the weld face from performing resistance spot welding; and texturing the weld face to provide the weld face with a surface roughness after dressing of the weld face.

13. The method as set forth in claim 12, wherein the surface roughness achieved by each texturing step ranges between approximately 2 μm and 50 μm, inclusive.

14. The method as set forth in claim 12, wherein dressing the weld face is removes a depth of material of the welding electrode ranging between approximately 25 μm and 250 μm, inclusive.

* * * * *